(12) United States Patent
Kim

(10) Patent No.: US 7,349,482 B2
(45) Date of Patent: Mar. 25, 2008

(54) ECHO CANCELLER OF ADSL SYSTEM AND TRAINING METHOD THEREOF

(75) Inventor: Yong-Woon Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 798 days.

(21) Appl. No.: 10/705,451

(22) Filed: Nov. 10, 2003

(65) Prior Publication Data

US 2004/0120272 A1 Jun. 24, 2004

(30) Foreign Application Priority Data

Nov. 22, 2002 (KR) .................. 10-2002-0073103

(51) Int. Cl.
*H04K 1/10* (2006.01)
*H04L 27/28* (2006.01)

(52) U.S. Cl. ............... 375/260; 375/285; 375/346; 375/372; 370/286; 370/292; 379/406.01; 379/406.05; 379/406.12

(58) Field of Classification Search ............... 375/260, 375/285, 346, 372; 370/286, 292; 379/406.01, 379/406.05, 406.12
See application file for complete search history.

(56) References Cited

U.S. PATENT DOCUMENTS 4,593,161 A 6/1986 Desblache et al.
4,792,915 A 12/1988 Adams et al.
5,305,379 A 4/1994 Takeuchi et al.
5,384,806 A * 1/1995 Agazzi .................. 375/222
6,891,948 B2 * 5/2005 Takada et al. ......... 379/406.01
6,990,083 B1 * 1/2006 Reina .................... 370/286
7,023,812 B1 * 4/2006 Beyda et al. ............ 370/286
2001/0036160 A1 11/2001 Curran et al.
2002/0048265 A1 4/2002 Glass
2002/0072331 A1 6/2002 Fischer et al.

FOREIGN PATENT DOCUMENTS

EP 0515057 A2 11/1992
KR 00256606 2/2000

* cited by examiner

*Primary Examiner*—Ted Wang
(74) *Attorney, Agent, or Firm*—Mills & Onello LLP

(57) ABSTRACT

An echo cancellation circuit includes delay units at its input unit and output unit in order to adjust the delay caused by a FIFO. The delay times of the delay units are trained using a training signal, such the REVERB signal, that is a system initializing signal. In addition, an upstream pilot tone is used to tune the delay time. The performance of the echo cancellation circuit is optimized according to the device and the method described.

21 Claims, 5 Drawing Sheets

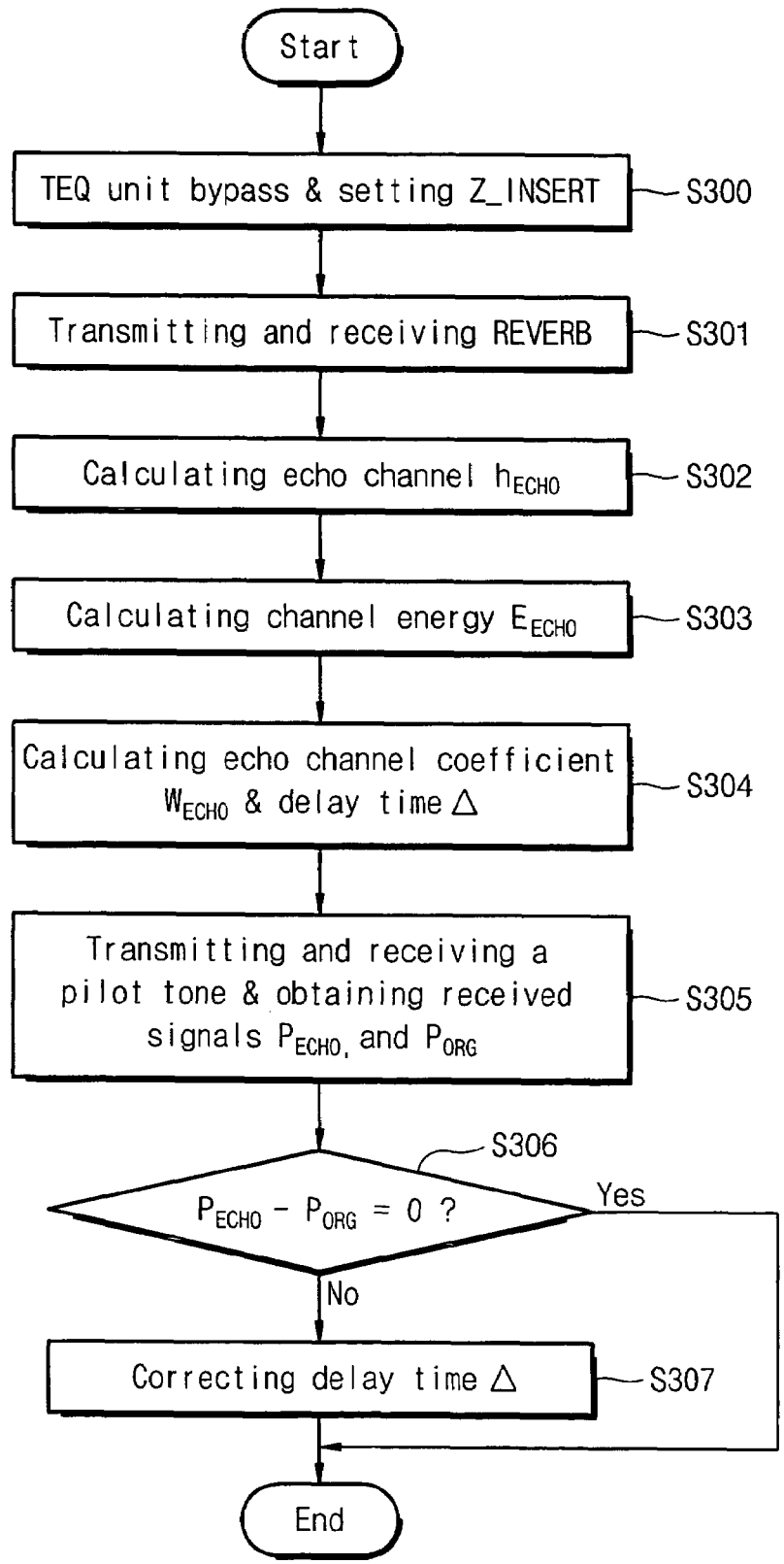

ECHO CANCELLER OF ADSL SYSTEM AND TRAINING METHOD THEREOF

BACKGROUND OF THE INVENTION

1. Field of the Invention

The present invention relates to an echo canceller of an ADSL system, and more particularly, to a method of training the echo canceller of the ADSL system.

2. Description of the Related Art

Generally, an echo canceller is a device for canceling a received signal reflected through a hybrid and/or a twisted-pair cable connected to other units in a communication system.

The contemporary asymmetric high speed digital subscriber line (ADSL) communication system partitions signals into a transmitted signal and a received signal by using an analog hybrid. The signals are properly and completely divided only when impedance is matched exactly. For example, if a communication channel is changed, or if passive elements of an analog hybrid have errors, the impedance is not exactly matched, and as a consequence, a transmitted signal of a transmitting system is input to a receiver of the transmitting system.

Echo cancellers include the finite impulse response (FIR) echo canceller, the infinite impulse response (IIR) echo canceller and the interpolated FIR echo canceller. For effective operation, the echo canceller should be able to monitor and learn the echo channels of a transmission medium to the highest degree possible and to remove the echo of a transmitted signal at a receiver irrespective of the echo canceller configuration.

An FIR echo canceller is generally the simplest and most adaptable form of echo canceller. The coefficient of the echo canceller is set so that the echo canceller can imitate echo channels. In general, the FIR echo canceller is tuned so that a squared error between the echo channel and the echo canceller is at a minimum. However, while the FIR echo canceller is used to imitate a general echo channel, the number of taps of the echo canceller can vary. Accordingly, the degree of calculation and complexity is increased.

The IIR echo canceller offers the advantages of a relatively small amount of calculation requirements and a relatively simple hardware configuration; however, stability of the IIR echo canceller is somewhat limited according to pole or poles of the IIR echo canceller. There are many problems in a digital echo canceller associated with training an echo channel. If the pole(s) and the zero(s) of the IIR echo canceller are not known, some problems can occur in the IIR echo canceller since the pole(s) and the zero(s) of the IIR echo canceller cannot be determined exactly. In this case, the coefficient of the IIR echo canceller is usually found using adaptive signal processing techniques. However, in this case, attention should be always paid to the stability of the IIR echo canceller.

The interpolated FIR echo canceller includes a number of stages of FIR echo cancellers so that the performance of the interpolated FIR echo canceller is better than that of the single-stage FIR echo canceller. However, the interpolated FIR echo canceller is more complex in its hardware and requires additional calculations in determining, or learning, the characteristics of an echo channel.

SUMMARY OF THE INVENTION

Accordingly, the present invention is directed to an echo canceller and a method of training an echo canceller of an ADSL system that substantially obviates one or more problems associated with limitations and disadvantages of the conventional approaches.

It is an object of the present invention to provide an echo canceller that is simple in calculation and easy to train.

It is another object of the present invention to provide a method of training an echo canceller of an ADSL system to the maximum extent.

In one aspect of the present invention, there is provided a method of training an echo canceller connected between a transmitter and a receiver in order to cancel signals transmitted from the transmitter and returned to the receiver, the method comprising the steps of: (a) controlling sample signals output by the transmitter so that a portion of the sample signals are changed and output; (b) transmitting an initializing signal at the transmitter; and (c) calculating at least one coefficient and a delay time of the echo canceller based on the initializing signal returned to the receiver.

In a preferred embodiment, the echo canceller is used in digital subscriber line and/or various (xDSL) communication systems. Here, the initializing signal is a REVERB signal. The echo canceller is connected between a FIFO synchronizer of the transmitter and a time domain equalizer of the receiver.

In this embodiment, in the control step (a), a portion of the sample signals output by the FIFO synchronizer of the transmitter are controlled to be modified.

In this embodiment, in the control step (a), one of the two consecutive sample signals output by the FIFO synchronizer of the transmitter is user data and the other of the two consecutive sample signals is any non-zero data.

In a preferred embodiment, the step (c) comprises the steps of: (c-1) calculating a frequency characteristic of the echo channel; (c-2) calculating an echo response in a time domain from the frequency characteristic of the echo channel; (c-3) calculating energy of the echo channel based on the echo response in the time domain; (c-4) setting a delay time of the echo canceller based on the energy of the echo channel; and (c-5) calculating the at least one coefficient of the echo canceller based on the echo response in the time domain and the delay time of the echo canceller.

In a preferred embodiment, the method further comprises the steps of: (d) transmitting a signal of a predetermined frequency at the transmitter; (e) obtaining a first signal received at the receiver during an operation state of the echo canceller; (f) obtaining a second signal received at the receiver during an idle state of the echo canceller; (g) comparing the first and second received signals; and (h) adjusting the delay time of the echo canceller according to the comparison result.

The predetermined frequency is, for example, a pilot tone.

In this embodiment, in the step (h), when the first and second received signals are different from each other, the delay time of the echo canceller is adjusted by as much as the time corresponding to phase difference of the first and second received signals.

In this embodiment, when the phase difference between the first and second received signal is 22.5°, the delay time of the echo canceller is adjusted by as much as one sample.

In another aspect of the present invention, there is provided a communication system for transmitting and receiving a data signal through a channel, the communication system comprising: a transmitter for modifying an initializing signal and transmitting the modified initializing signal during operation in a training mode-in transmitting the data signal that includes the initializing signal through the channel; a receiver for receiving the data signal returned from the channel; and an echo cancellation circuit connected between the transmitter and the receiver, for removing echoes of the data signal transmitted by the transmitter and received by the receiver, wherein the echo cancellation circuit is trained in the training mode based on the initializing signal in the data signal received by the receiver.

In a preferred embodiment, the echo cancellation circuit comprises: a first delay unit for delay a signal output from the transmitter; an echo canceller for receiving a signal output by the first delay unit and removing echoes of the signal transmitted through the channel and received by the receiver; and a second delay unit for delaying an signal output by the echo canceller and for supplying the receiver with the delayed signal.

In another aspect of the present invention, there is provided a communication system for transmitting and receiving a data signal through a channel, the communication system comprising: an encoder for encoding a data signal to be transmitted; an inverse fast Fourier transform (IFFT) unit for converting a data signal in a frequency domain output from the encoder into a data signal in a time domain; a transmitting FIFO buffer for synchronizing the data signal output from the IFFT unit, and modifying and outputting some portion of the data signal output from the IFFT unit; an output filter for transforming for filtering a data signal output from the transmitting FIFO buffer and transferring the filtered data signal to the channel; an input filter for filtering the data signal received from the channel; a time domain equalizer for modifying the effective length of the channel in the time domain for the data signal filtered by the input filter; a FIFO buffer for synchronizing a data signal output from the time domain equalizer; a fast Fourier transform (FFT) unit for converting the data signal in the time domain output by the FIFO buffer into a data signal in the frequency domain; a decoder for decoding a data signal in the frequency domain converted by the FFT; and a echo cancellation circuit for removing received echoes of the data signal transmitted through the channel. The echo cancellation circuit comprises: a first delay unit for delaying a signal output by the FIFO buffer; an echo canceller for receiving a signal output by the first delay unit and removing received echoes of the signal transmitted through the channel; and a second delay unit for delaying a signal output by the echo canceller and supplying the time domain equalizer with the delayed signal.

In a preferred embodiment, the communication system is used in digital subscriber line communication system and its variations (xDSL). The initializing signal is a REVERB signal.

In this embodiment, one of the two consecutive sample signals output from the FIFO buffer is user data and the other of the two consecutive sample signals is zero.

In this embodiment, in a training mode, one of the two consecutive sample signals output from the FIFO buffer is user data and the other of the two consecutive sample signals is any non-zero data.

In a preferred embodiment, the delay time of the echo cancellation circuit is calculated based on channel energy in the time domain received to the receiver.

In this embodiment, the channel energy in the time domain is calculated based on an echo response in the time domain converted from an echo response in the frequency domain by the IFFT unit of the transmitter.

In this embodiment, an echo response in the frequency domain is calculated using ratio of a frequency characteristic received to the receiver to a frequency characteristic of the echo channel transmitted from the transmitter.

In this embodiment, the echo channel in the frequency domain that is not received among the echo channels received to the receiver is determined using extrapolation.

In this embodiment, the IFFT unit is a 128-point IFFT unit and the FFT unit is a 512-point FFT unit.

In this embodiment, the frequency characteristic of the echo channel transmitted from the transmitter is a frequency characteristic of a 512-point data signal converted from a 128-point data signal.

In this embodiment, the delay time of the first delay unit is set to be maximum integer of delay time of the echo cancellation circuit divided by 4.

In this embodiment, the delay time of the second delay unit is represented by: (delay time of the echo cancellation circuit)−4×(delay time of the first delay unit).

In this embodiment, the delay time of the echo cancellation circuit is corrected based on the delay time of a transmitting FIFO buffer of the transmitter and the delay time of a receiving FIFO buffer of the transmitter.

In this embodiment, the delay time of the echo canceller is adjusted based on the difference between a data signal received at the receiver in the echo canceller's operation state and a data signal received at the receiver in the echo canceller's idle state while the transmitter transmits a pilot tone. When phase difference between the received signal in the echo canceller's operation state and the received signal in the echo canceller's idle state is 22.5°, the delay time of the echo canceller is adjusted as much as one sample.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

In the drawings:

FIG. 7 illustrates a control flow of a method of training the echo canceller, in accordance with the present invention.

DETAILED DESCRIPTION OF PREFERRED EMBODIMENTS

Reference will now be made in detail to the preferred embodiments of the present invention, examples of which are illustrated in the accompanying drawings. However, the present invention is not limited to the embodiments illustrated herein after, and the embodiments herein are rather introduced to provide easy and complete understanding of the scope and spirit of the present invention.

Figure 1:
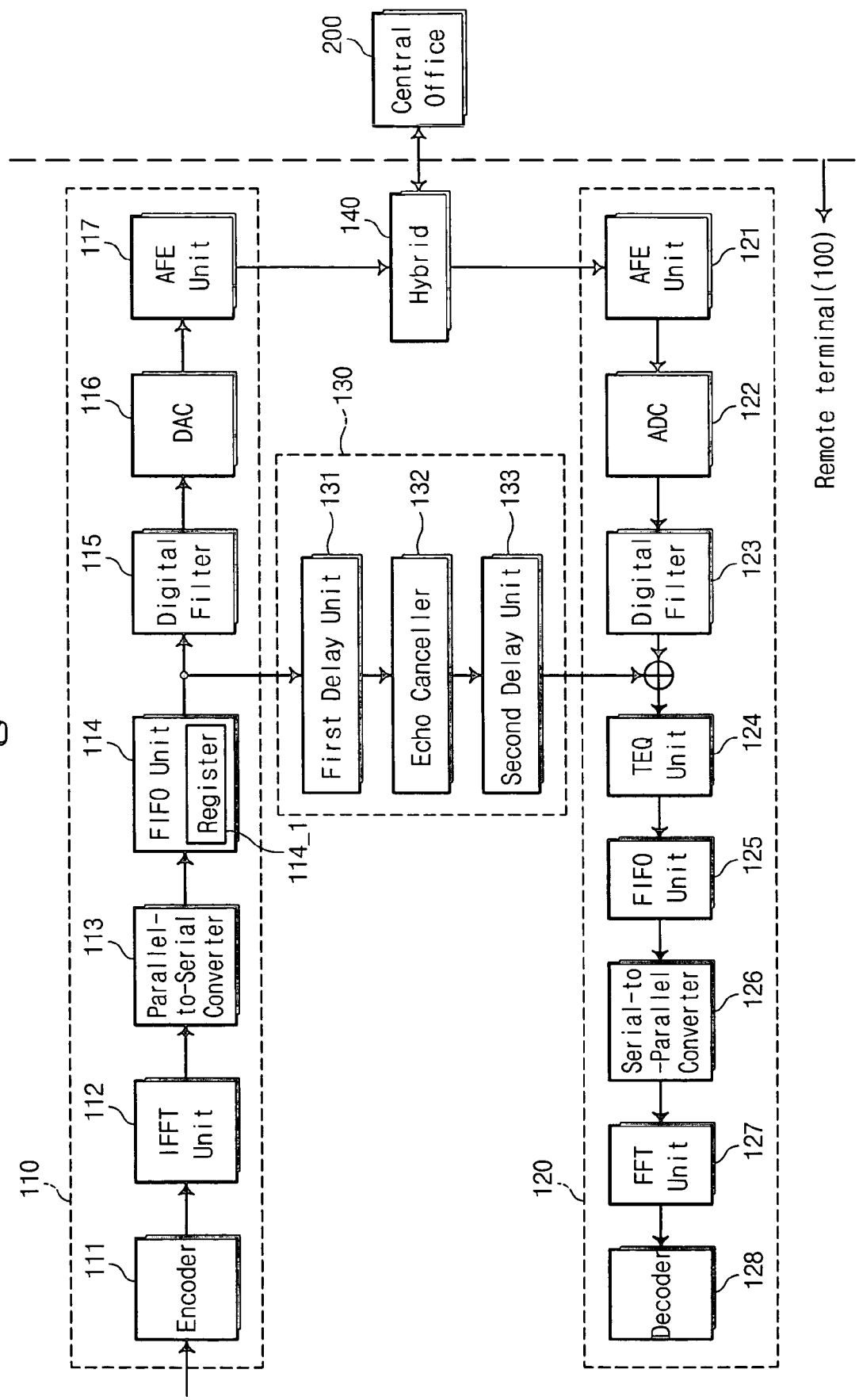
FIG. 1 is a block diagram of a circuit configured in a remote terminal of an ADSL system, in accordance with the present invention.

FIG. 1 is a block diagram of a circuit configured in a remote terminal of an ADSL system, in accordance with the present invention. Referring to FIG. 1, the references 110, 120 and 130 denote a transmitter, a receiver and an echo cancellation circuit respectively.

The transmitter 110 includes an encoder 111, an inverse fast Fourier transform (IFFT) unit 112, a parallel-to-serial converter (PSC) 113, a first in first out (FIFO) synchronizer 114, a digital filter (DF) 115, a digital-to-analog converter (DAC) 116, and an analog front end (AFE) unit 117.

The receiver 120 includes a receiving AFE unit 121, an analog-to-digital converter (ADC) unit 122, a DF 123, a time domain equalizer (TEQ) 124, a FIFO synchronizer 125, a serial-to-parallel converter (SPC) 126, a fast Fourier transform (FFT) unit 127, and a decoder, 128.

The echo cancellation circuit 130 includes a first delay unit 131, an echo canceling unit 132 and a second delay unit 133.

Referring to FIG. 1, the reference 140 denotes a hybrid connected to a channel provided between the transmitter 110 and the receiver 120, that is, a transmission path such as telephone network.

Bit streams of transmission data (TD) are input to the encoder 111. The encoder 111 divides the parallel bit streams into a plurality of parallel bit string groups (that is, n pieces), encodes each of parallel bit string groups into coded information and outputs the coded information to the IFFT unit 112. The coding method of the encoder 111 is, for example, quadrature amplitude modulation (QAM), which is suitable for the ADSL system. Here, n-coded pieces (hereafter, referred to as "n-code information") are allocated to n pieces of carriers. Each of the carriers is transmitted as a symbol (hereafter, referred to as a "transmission symbol").

IFFT unit 112 performs IFFT by considering the n-code information and converts the n-code information from a frequency domain signal into a time domain signal. The parallel signals in the time domain converted by IFFT unit 112 are converted into serial signals by the PSC 113. The FIFO synchronizer 114 synchronizes the data transmission and reception of ADSL physical layer. The transmitted signal output from the FIFO synchronizer 114 is filtered through the DF 115 and converted into an analog signal by the DAC 116. The converted analog signal is filtered through the AFE unit 117 and transformed to the channel through the hybrid 140.

Since each of components of the receiver 120 operates substantially inversely with respect to each of components of the transmitter 110, the detailed description thereof will be omitted. The TEQ 124 adjusts the effective length of the channel in the time domain to perform equalization.

The echo cancellation circuit 130 attenuates the signal of the echo channel from the DF 115 of the transmitter 110 to the DF 123 of the receiver 120. In other words, a transmitted signal of a remote terminal 100 is not entirely transmitted to a central office (CO) 200 in complete form, but rather, a portion of the transmitted signal of the remote terminal 100 is input back into the receiver of the remote terminal 100, since an echo may have occurred during transmission. This phenomenon may be caused by the channel connected between the remote terminal 100 and the CO 200, but, in most cases is caused primarily due to the analog hybrid 140. Similarly, the echo cancellation circuit 130 is used to prevent the signal transmitted from the transmitter 110 of the remote terminal 100 from affecting the receiver 120 of the remote terminal 100.

In this embodiment, it is assumed that the transmitter 110 uses a 128-point IFFT unit 112 and the receiver 120 uses a 512-point FFT unit 127. In this manner, the transmitted signal is upsampled by a double Nyquist rate for more efficient transmission in 32 sub-channels. The receiver 120 uses 256 sub-channels to process the received signal by the Nyquist rate. Accordingly, at the receiver 120, the transmitted signal of the transmitter 110 appears as though it is quadruply upsampled. This phenomenon should be considered when the echo cancellation circuit 130 is designed.

In a preferred embodiment, the echo cancellation circuit 130 includes delay units 131 and 133, since entire echo delay should be adjusted. The echo canceller 132 may optionally include a single delay unit at its output, without consideration of the system efficiency of the entire system, however, an echo canceller 132 provided with delay units 131 and 133 at both its input terminal and its output terminal respectively is preferred. Since one sample of the delay unit 131 at the input terminal of the echo canceller 132 corresponds to four samples of the delay unit 133 at the output terminal of the echo canceller 132, it is not necessary that the FIFO memory configured at the echo canceller 132 is designed to be large. A delay below four samples can be adjusted using the delay unit 132 at the output portion of the echo canceller 132.

The echo canceller 132 is a time-domain echo canceller since it is positioned after the IFFT unit 112 and before the FFT unit 127. Accordingly, the number of the taps of the FIR echo canceller is preferably matched to the number of points of the FFT unit 127 of the receiver 120. However, the number of the taps of the FIR echo canceller should be large enough that the echo cancellation efficiency is maximized considering system efficiency and hardware size. In the present example, it is suggested that the echo canceller 132 include 256 taps, or half the number of the points of the FFT unit 127. Accordingly, the value of the first delay unit 131 can be from 0 to 127 and the value of the second delay unit 133 can be from 0 to 3.

As stated above, in the present example, 128-point IFFT unit 112 is used in the transmitter 110. Accordingly, a double Nyquist rate is used. In the signal output from the transmitting FIFO unit 114, one sample of the two samples is user data and the other sample has a zero value. If the sample that should be zero has a non-zero value, the output signal of the transmitting FIFO unit 114 is not a desired signal. In other words, the transmitter behaves as if the transmitted signal using 32 sub-channels is a signal using 64 sub-channels. Here, the data of $32^{nd}$-$63^{rd}$ sub-channels are the complex conjugates of the data of $0^{th}$-$31^{st}$ sub-channels. In other words, the imaginary part of the transmitted signal appears. Using these characteristics, the method of the present invention of training the echo canceller 132 is performed.

To use this in the echo canceller 132, the FIFO unit 114 is provided with a Z_INSERT register 114_1 to input any value to a zero sample between samples of the user data. Accordingly, the characteristics of the $32^{nd}$-$63^{rd}$ sub-channels that cannot be recognized in the conventional approaches can be recognized easily in the present invention. In the present invention, this register 114_1 is designed to input a predetermined value to a training interval of the echo canceller 132 and is used to train the echo canceller 132.

In the ADSL system, the echo canceller 132 is trained within R_ECT and C_ECT intervals in an initialization process. Since the present invention relates to an echo canceller 132 of a remote terminal 100, the echo canceller 132 is trained within the R_ECT interval. Within the R_ECT interval, the echo canceller 132 can be trained using any signal as long as a given power spectral density (PSD) mask is violated. Since the ADSL system is designed to transmit a REVERB or MEDLEY signal that is an initializing signal, the echo canceller 132 can be trained, for example, using the REVERB signal.

Figure 2:
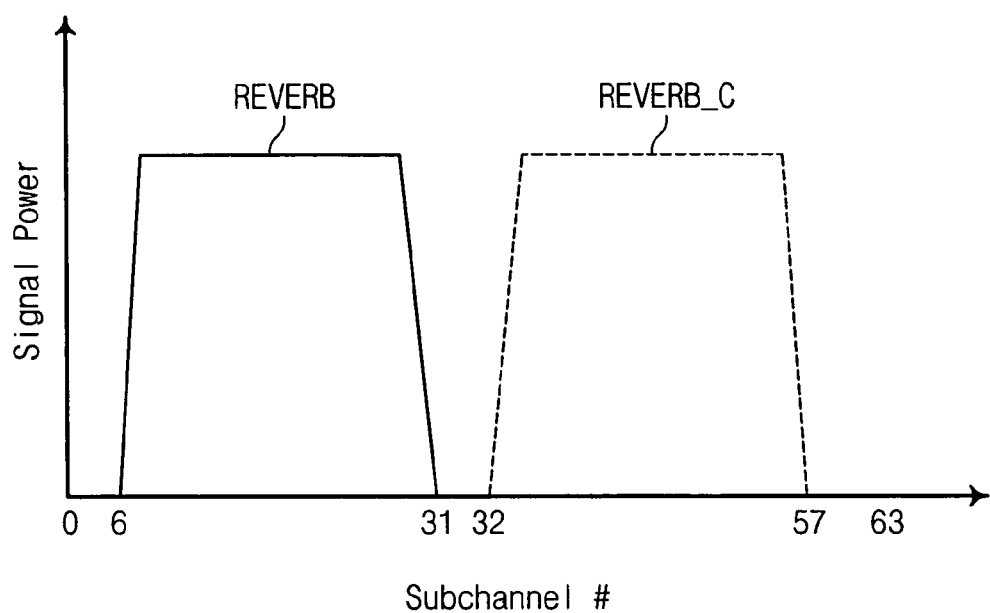
FIG. 2 illustrates a signal for training an echo canceller, in accordance with the present invention.

Especially, as described above, if a non-zero value is input to the Z_INSERT register 114_1 of FIFO unit 114 of the transmitter 110 while the REVERB signal is transmitted, a transmitted signal as shown in FIG. 2 can be generated. In FIG. 2, the signal marked by a solid line is the REVERB signal that is an initializing signal and the signal marked by a dotted line is the REVERB_C signal that is the complex conjugate signal of the REVERB signal. The receiver 120 of the remote controller 100 can recognize not only an upstream channel but also the downstream channels of the $32^{nd}$-$63^{rd}$ sub-channels.

Figure 3:
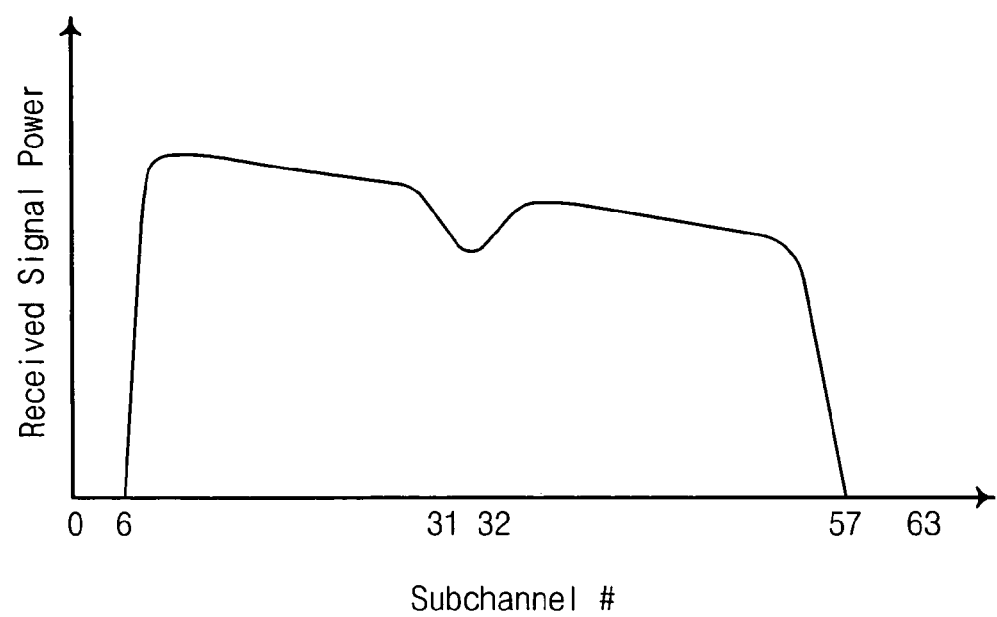
FIG. 3 illustrates an amplitude characteristic of an echo channel received at a receiver, in accordance with the present invention.
Figure 4:
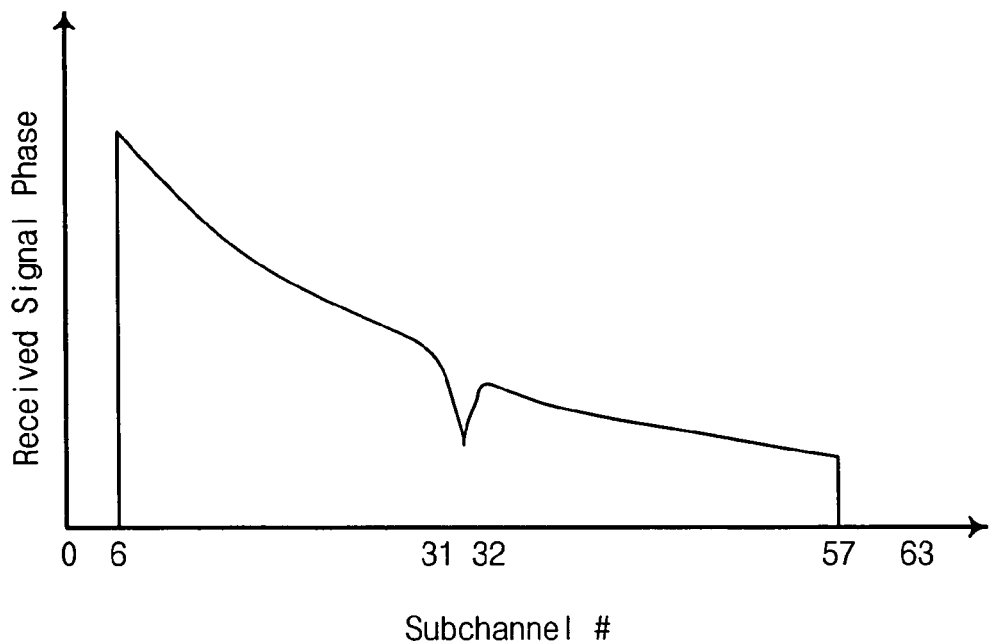
FIG. 4 illustrates a phase characteristic of the signal shown in FIG. 3, in accordance with the present invention.

The received signal that can be obtained using the transmitted signal as shown in FIG. 2 is shown in FIGS. 3 and 4. FIG. 3 illustrates an amplitude characteristic of an echo channel received at a receiver, and FIG. 4 illustrates a phase characteristic of the signal shown in FIG. 3. As shown in FIG. 3, since the received signal includes noise at every DMT frame, a few of the frames are averaged to cancel this. The echo of the initializing signal REVERB can be obtained using this method. The frequency characteristic $H_{ECHO}$ of the echo channel is represented as Expression 1.

$$H_{ECHO} = \frac{Y_{AVG}}{REV_{Z\_INSERT}} \quad \text{Expression 1}$$

where $Y_{AVG}$ is an average of a few of the frames, and $REV_{Z\_INSERT}$ is the REVERB signal when any non-zero value is input to Z_INSERT register 141_1.

The time domain signal can be obtained through the IFFT unit 112 for the frequency characteristic signal of the echo channel. If the echo response in the time domain is $h_{ECHO}$, $h_{ECHO}$ is represented as Expression 2.

$$h_{ECHO} = IFFT\{H_{ECHO}\} \quad \text{(Expression 2)}$$

Here, however, $REV_{Z\_INSERT}$ is a transmitted signal generated via a 128-point IFFT unit 112 and $Y_{AVG}$ is a received signal received through the 512-point FFT unit 127. Accordingly, the frequency characteristic of the echo channel cannot be obtained directly as represented by Expression 2. To resolve this problem, the frequency characteristic of the transmitted signal should be matched with the frequency characteristic of the received signal. To put the 128-point transmitted signal in the frequency region of the 512-point received signal, $REV_{Z\_INSERT}$ should be made to be a vector matrix, as represented by Expression 3.

$$REV_{Z\_INSERT} = [REV_{Z\_INSERT}\ REV_{Z\_INSERT}\ REV_{Z\_INSERT}\ REV_{Z\_INSERT}] \quad \text{(Expression 3)}$$

This is the method used to match the frequencies of the transmitted signal and the received signal, since the transmitted signal is a signal whose frequency is up to 276 KHz and the received signal is a signal whose frequency is up to 2.208 MHz. Accordingly, if the transmitted signal obtained by Expression 3 is substituted into Expression 1, the desired echo channel can be obtained.

Figure 5:
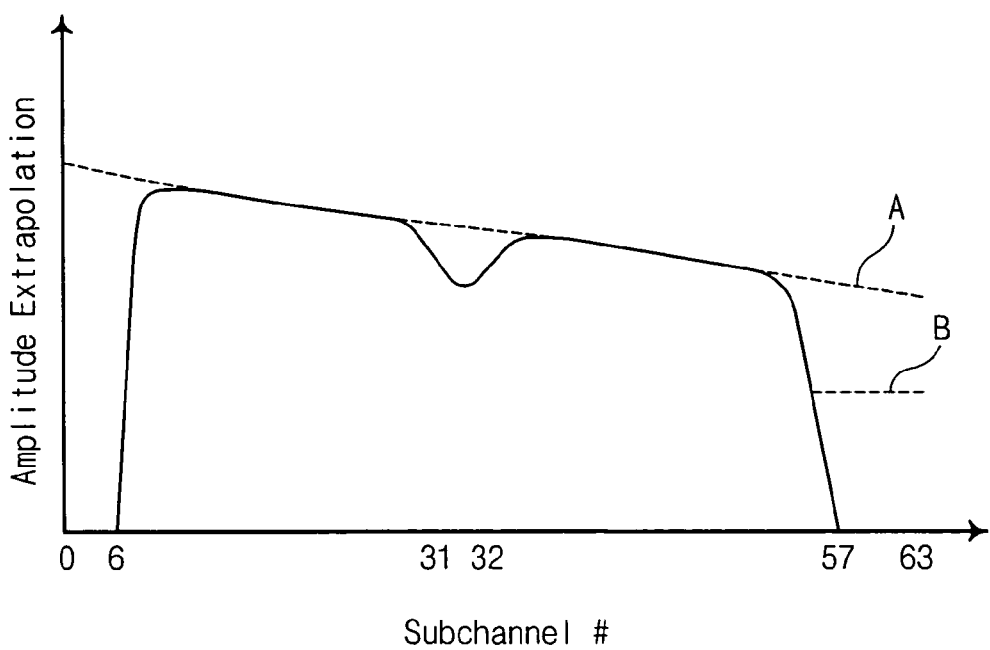
FIG. 5 illustrates an example of extrapolation with respect to amplitude of an echo channel, in accordance with the present invention.
Figure 6:
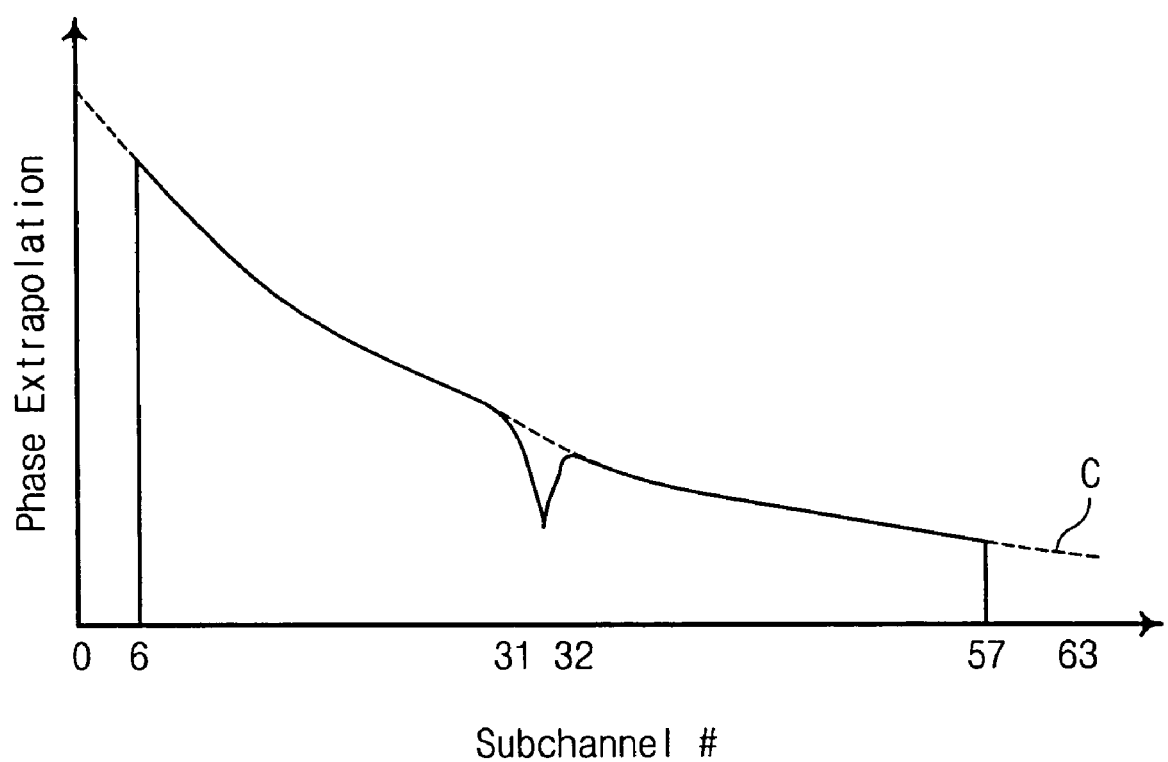
FIG. 6 illustrates an example of extrapolation with respect to phase of an echo channel, in accordance with the present invention.

Here, the process described above is performed under the assumption that there is a predetermined channel due to extrapolation with respect to the echo channel in an unobtainable frequency region. The extrapolation of the echo channel is performed under the assumption that the linearity of the channel is ensured. The extrapolation should be performed on the amplitude characteristic of the echo channel as long as the characteristic of the desired frequency band is not changed. The channel extrapolation is performed under the assumption that the phase of the echo channel is linear within the used frequency band. FIGS. 5 and 6 illustrate an example of extrapolation of an echo channel.

FIG. 5 illustrates an example of extrapolation with respect to amplitude of an echo channel. It is assumed that there is a channel region which cannot be obtained by the echo training signal. Under this method, the known characteristic is improved. Various methods can be used for the amplitude extrapolation, as long as the channel extrapolation is performed as denoted by graph A or B in FIG. 5. FIG. 6 illustrates an example of extrapolation with respect to the phase of an echo channel. The phase of the known channel due to the echo training signal may not necessarily be linear but the extrapolation can be performed as denoted by C in FIG. 6 under the assumption that the phase of the channel in the frequency band from which phase information cannot be obtained is ensured to be linear.

The time domain response according to the method described above is a 512-point sample response. If the number of the taps of the FIR type echo canceller is 512, the time domain response obtained as described above can be the coefficient of the echo canceller 132 without the need for any delay unit. However, in order to reduce the complexity and amount of calculations required by the hardware, the method to make the delay unit and time domain echo response correspond to the echo canceller should be determined so that the number of the taps of the echo channel is designed to be less than 512 samples.

In the present invention, the time domain response of the range in which the time domain channel energy corresponding to the number of the taps of the echo canceller is the most highly distributed is made to correspond with the coefficient of the echo canceller. The time domain channel energy $E_{ECHO}$ is represented by Expression 4.

$$E_{ECHO}(K) = \sum_{n=1}^{K} |h_{ECHO}(n+k)|^2 \quad \text{Expression 4}$$

where K is the number of the taps of the echo canceller 132 and is, for example, 256.

Here, the delay time $\Delta$ of the echo canceller 132 is represented as in Expression 5.

$$\Delta = \underset{k}{\text{MAX}}((E_{ECHO}(k)) \quad \text{Expression 5}$$

In other words, the k when $E_{ECHO}(k)$ is at a maximum is set to be the delay time $\Delta$.

The delay times of the delay units 131 and 133 of the echo cancellation circuit 130 are represented in Expressions 6 and 7.

$$Delay_1 = INT\left(\frac{\Delta}{4}\right) \quad \text{Expression 6}$$

-continued $$Delay_2 = \Delta - 4 \times Delay_1 \quad \text{Expression 7}$$

In Expression 6, function INT(k) means the maximum integer not greater than k. Accordingly, the delay time Delay1 of the delay unit 131 adjusts the delay time of the 128-point transmitted signal and the delay time Delay2 of the delay unit 133 adjusts the delay time of an output signal of the echo canceller 132. Here, the coefficient $w_{ECHO}$ of the echo canceller is determined as represented in Expression 8.

$$w_{ECHO}(k) = h_{ECHO}(k+\Delta), k=0, \ldots, K-1 \quad \text{(Expression 8)}$$

However, as shown in FIG. 1, the position of the echo canceller 132 cancels the echoes of the data following the transmitting FIFO unit 114 and before the TEQ unit 124. The above-mentioned method of training the echo canceller 132 is made based on the signal processing of the FFT unit 127 and the IFFT unit 112. Accordingly, to apply this to an actual hardware configuration, the delay of the transmitting FIFO unit 114 and the delay of the receiving FIFO unit 125 should be considered. In other words, if the delay of the FIFO unit 114 is $\Delta_{TX}$ and the receiving FIFO unit 125 is $\Delta_{RX}$, the $\Delta$ used in calculating the delay times of the delay units 131 and 133 should be corrected as in Expression 9.

$$\Delta = \Delta - \Delta_{TX} - \Delta_{RX} \quad \text{(Expression 9)}$$

Similarly, the delay times of the delay units 131 and 133 in the echo cancellation circuit 130 and coefficient of the echo canceller 132 are set in consideration of the delays of the FIFO units 114 and 125. To confirm the delay times and coefficient, after an upstream pilot tone is transmitted, the output of the echo cancellation circuit 130 at the time when the echo cancellation circuit is turned on is compared with the received pilot tone at the time when the echo cancellation circuit is turned off. The upstream pilot tone is a sine wave that uses the 16$^{th}$ sub-channel and is 69 KHz. Expression 10 should be satisfied.

$$P_{ECHO} \approx P_{ORG} \quad \text{(Expression 10)}$$

where $P_{ECHO}$ is a received signal of the echo channel received after the upstream pilot tone is transmitted and $P_{ORG}$ is a received signal of the echo channel received after the echo cancellation circuit is turned off.

However, the theoretical sample delays of the transmitting FIFO unit 114 and the receiving FIFO unit 125 can deviate by one or two samples due to FIFO operation and the reset operation of the hardware. Because of the difference in sample delays as described above, Expression 10 is not satisfied. It is easy to resolve this problem if the phases of $P_{ECHO}$ and $P_{ORG}$ are considered. Since $P_{ECHO}$ and $P_{ORG}$ is the received signal of the upstream pilot tone, the degree to which the sample delay deviated from the phase difference of these FIFO units can be known.

Since the upstream pilot tone uses the 16$^{th}$ sub-channel, the phase of the received pilot is changed by 22.5° when the sample delay deviates by one sample at the receiver 120. Accordingly, the precise value of the sample delay can be found due to the phase difference between $P_{ECHO}$ and $P_{ORG}$. If the sample delay of the phase difference of between $P_{ECHO}$ and $P_{ORG}$ is set to be $\Delta_{PILOT}$, Expression 9 should be changed into Expression 11.

$$\Delta = \Delta - \Delta_{TX} - \Delta_{RX} - \Delta_{PILOT} \quad \text{(Expression 11)}$$

Here, the relation of $\Delta_{PILOT}$ and the phase difference of between $P_{ECHO}$ and $P_{ORG}$ can be represented as Table 1.

TABLE 1

| $\angle P_{ECHO} - \angle P_{ORG}$ | $\Delta_{PILOT}$ |
|---|---|
| . | . |
| . | . |
| . | . |
| −90.0 | −4 |
| −67.5 | −3 |
| −45.0 | −2 |
| −22.5 | −1 |
| 0 | 0 |
| 22.5 | 1 |
| 45.0 | 2 |
| 67.5 | 3 |
| 90.0 | 4 |
| . | . |
| . | . |
| . | . |

However, since the phase difference of between $P_{ECHO}$ and $P_{ORG}$ is not consistent with the Table exactly, Table 1 can be referred to using the distribution of the phase difference between $P_{ECHO}$ and $P_{ORG}$.

The control flow of a method of training the echo cancellation circuit 130 will now be described in detail referring to FIG. 7.

Referring to FIG. 7, at step S300, at the initiation of training of the echo cancellation circuit 130, the TEQ unit 124 of the receiver 120 is set to bypass a received signal and the Z_INSERT register 114_1 of the FIFO unit 114 of the transmitter 120 is set to be a predetermined value.

At step S301, if the transmitter 110 transmits an initializing signal REVERB, the receiver 120 receives the initializing signal as an echo signal. At step S302, the time domain response $h_{ECHO}$ is calculated. As described above, the time domain response $h_{ECHO}$ can be calculated according to Expressions 1 and 2. At the step S303, the channel energy $E_{ECHO}$ is calculated. The channel energy $E_{ECHO}$ is, for example, calculated according to Expressions 3 and 4. At step S304, the echo channel coefficient $w_{ECHO}$ and the delay time $\Delta$ of the echo cancellation circuit 130 are calculated according to Expressions 5 to 9. At step S305, the transmitter 110 transmits the pilot tone. Here, the echo cancellation circuit 130 is switched to operation state or idle state. The signal received while the echo cancellation circuit 130 operates is referred to as $P_{ECHO}$ and the signal received while the echo cancellation circuit 130 does not operate is referred to as $P_{ORG}$. At step S306, it is determined whether the received signals $P_{ECHO}$ and $P_{ORG}$ are the same as each other according to whether the echo cancellation circuit 130 is operating. If the two signals $P_{ECHO}$ and $P_{ORG}$ are not the same as each other, control proceeds to step S307. At step S307, the delay time $\Delta$ of the echo canceller 132 is adjusted in accordance with the phase difference between the received signals $P_{ECHO}$ and $P_{ORG}$ according to whether the echo cancellation circuit 130 is operating.

In the present invention as described above, the echo canceller is provided with delay units at an input terminal and at an output terminal of the echo canceller respectively so as to correct the delay caused by the corresponding FIFO unit. The canceller is trained on the delay time of the delay units by using the REVERB signal as an initializing signal. Therefore, the echo canceller of the present invention can be trained easily with relatively simple hardware, as compared with the conventional echo canceller. In addition, an upstream pilot tone is used for tuning the delay time. Accordingly, the performance of the echo cancellation circuit is optimized.

While this invention has been particularly shown and described with references to preferred embodiments thereof, it will be understood by those skilled in the art that various changes in form and detail may be made herein without departing from the spirit and scope of the invention as defined by the appended claims.

What is claimed is:

1. A method of training an echo canceller connected between a First in First out (FIFO) synchronizer of a transmitter and a time domain equalizer of a receiver in order to cancel signals transmitted by the transmitter and returned to the receiver, the method comprising the steps of:
    (a) controlling sample signals output by the transmitter so that a portion of the sample signals are changed and output, wherein controlling sample signals comprises changing and outputting a portion of the sample signals output by the FIFO synchronizer;
    (b) transmitting an initializing signal at the transmitter; and
    (c) calculating at least one coefficients and a delay time of the echo canceller based on the initializing signal returned to the receiver, wherein during the controlling step (a), one of two consecutive sample signals output by the FIFO synchronizer of the transmitter is user data and the other of the two consecutive sample signals is non-zero data.

2. A method of training an echo canceller connected between a transmitter and a receiver in order to cancel signals transmitted by the transmitter and returned to the receiver, the method comprising the steps of:
    (a) controlling sample signals output by the transmitter so that a portion of the sample signals are changed and output;
    (b) transmitting an initializing signal at the transmitter;
    (c) calculating at least one coefficients and a delay time of the echo canceller based on the initializing signal returned to the receiver;
    (d) transmitting a signal of a predetermined frequency at the transmitter;
    (e) obtaining a first signal received at the receiver during an operation state of the echo canceller;
    (f) obtaining a second signal received at the receiver during an idle state of the echo canceller;
    (g) comparing the first and second received signals; and
    (h) adjusting the delay time of the echo canceller according to the comparison result.

3. The method of claim 2, wherein the predetermined frequency is a pilot tone.

4. The method of claim 2, wherein in the step (h), when the first and second received signals state are different from each other, the delay time of the echo canceller is adjusted by as much as a time corresponding to phase difference of the first and second received signals.

5. The method of claim 4, wherein when phase difference between the first and second received signals is 22.5°, the delay time of the echo canceller is adjusted by as much as the time period of one sample.

6. A communication system for transmitting and receiving a data signal through a channel, the communication system comprising:
    a transmitter for modifying an initializing signal and transmitting the modified initializing signal during operation in a training mode while transmitting the data signal that includes the initializing signal through the channel;
    a receiver for receiving the data signal returned from the channel; and
    an echo cancellation circuit connected between the transmitter and the receiver, for removing echoes of the data signal transmitted by the transmitter and received by the receiver, wherein the echo cancellation circuit is trained in the training mode based on the initializing signal in the data signal received by the receiver, the echo cancellation circuit configured to:
        calculate an echo response in a time domain of an echo channel;
        calculate an energy of the echo channel; and
        calculate at least one coefficient and delay time of the cancellation circuit from the echo response in the time domain and the energy of the echo channel, wherein the echo cancellation circuit comprises:
    a first delay unit for delaying a signal output by the transmitter as a first delayed signal;
    an echo canceller for receiving the first delayed signal output by the first delay unit and removing echoes of the signal transmitted through the channel and received by the receiver; and
    a second delay unit for delaying a signal output by the echo canceller as a second delayed signal and for supplying the receiver with the second delayed signal.

7. A communication system for transmitting and receiving a data signal through a channel, the communication system comprising:
    an encoder for encoding a data signal to be transmitted;
    an inverse fast Fourier transform (IFFT) unit for converting a data signal in a frequency domain output from the encoder into a data signal in a time domain;
    a transmitting First in First out (FIFO) buffer for synchronizing the data signal output from the IFFT unit, and modifying and outputting a portion of the data signal output from the IFFT unit;
    an output filter for filtering the data signal output by the transmitting FIFO buffer and transferring the filtered data signal to the channel;
    an input filter for filtering the data signal received from the channel;
    a time domain equalizer for modifying the effective length of the channel in the time domain for the data signal filtered by the input filter;
    a FIFO buffer for synchronizing the data signal equalized by the time domain equalizer;
    a fast Fourier transform (FFT) unit for converting the data signal in the time domain output by the FIFO buffer into a data signal in the frequency domain;
    a decoder for decoding the data signal in the frequency domain converted by the FFT; and
    an echo cancellation circuit for removing received echoes of the data signal transmitted through the channel, wherein the echo cancellation circuit comprises:
        a first delay unit for delaying a signal output by the FIFO buffer as a first delayed signal;
        an echo canceller for receiving the first delayed signal output by the first delay unit and removing received echoes of the signal transmitted through the channel; and
        a second delay unit for delaying a signal output by the echo canceller as a second delayed signal and for supplying the time domain equalizer with the second delayed signal, wherein, when in a normal mode, one of two consecutive sample signals output by the FIFO buffer is user data and the other of the two consecutive sample signals is zero.

8. The communication system of claim 7, wherein the communication system is used in digital subscriber line (xDSL) communication system.

9. The communication system of claim 7, wherein the initializing signal is a REVERB signal.

10. The communication system of claim 7, wherein in a training mode, one of the two consecutive sample signals output by the FIFO buffer is user data and the other of the two consecutive sample signals is non-zero data.

11. The communication system of claim 8, wherein the delay time of the echo cancellation circuit is calculated based on channel energy in the time domain received by the receiver.

12. The communication system of claim 11, wherein the channel energy in the time domain is calculated based on an echo response in the time domain converted from an echo response in the frequency domain by the IFFT unit of the transmitter.

13. The communication system of claim 12, wherein an echo response in the frequency domain is calculated using a ratio of a frequency characteristic received by the receiver to a frequency characteristic of the echo channel transmitted by the transmitter.

14. The communication system of claim 13, wherein the echo channel in the frequency domain that is not received among the echo channels received by the receiver is determined using extrapolation.

15. The communication system of claim 8, wherein the IFFT unit is a 128-point IEFT unit and the FFT unit is a 512-point FFT unit.

16. The communication system of claim 15, wherein the frequency characteristic of the echo channel transmitted by the transmitter is a frequency characteristic of a 512-point data signal converted from a 128-point data signal.

17. The communication system of claim 16, wherein the delay time of the first delay unit is set to be maximum integer of delay time of the echo cancellation circuit divided by 4.

18. The communication system of claim 17, wherein the delay time of the second delay unit is represented by:

(delay time of the echo cancellation circuit)−4(delay time of the first delay unit).

19. The communication system of claim 18, wherein the delay time of the echo cancellation circuit is corrected based on the delay time of a transmitting FIFO buffer of the transmitter and the delay time of a receiving FIFO buffer of the transmitter.

20. The communication system of claim 19, wherein the delay time of the echo canceller is adjusted based on the difference between a first data signal received at the receiver during operation in an operation state and a second data signal received at the receiver during operation in an idle state while the transmitter transmits a pilot tone.

21. The communication system of claim 20, wherein when phase difference between the received signal in the echo canceller's operation state and the received signal in the echo canceller's idle state is 22.5°, the delay time of the echo canceller is adjusted as much as one sample.

* * * * *

UNITED STATES PATENT AND TRADEMARK OFFICE
CERTIFICATE OF CORRECTION

PATENT NO. : 7,349,482 B2 Page 1 of 1
APPLICATION NO. : 10/705451
DATED : March 25, 2008
INVENTOR(S) : Yong-Woon Kim It is certified that error appears in the above-identified patent and that said Letters Patent is hereby corrected as shown below:

Column 13, line 29 claim 15 delete "IEFT" and insert --IFFT--

Signed and Sealed this

Twenty-sixth Day of August, 2008

JON W. DUDAS
*Director of the United States Patent and Trademark Office*